(12) United States Patent
Ostapovicz et al.

(10) Patent No.: US 9,195,400 B1
(45) Date of Patent: Nov. 24, 2015

(54) SNAPSHOT DATA MANAGEMENT FOR MODELING AND MIGRATION PLANNING OF DATA STORAGE SYSTEMS

(71) Applicant: EMC Corporation, Hopkinton, MA (US)

(72) Inventors: Scott Ostapovicz, Holliston, MA (US); Karen Murphy, Cork (IE); Fergal Gunn, Cork (IE); Michael Schwartz, Hamden, CT (US); David Bowden, Cork (IE)

(73) Assignee: EMC Corporation, Hopkinton, MA (US)

( * ) Notice: Subject to any disclaimer, the term of this patent is extended or adjusted under 35 U.S.C. 154(b) by 253 days.

(21) Appl. No.: 13/834,033

(22) Filed: Mar. 15, 2013

(51) Int. Cl.
   *G06F 3/06* (2006.01)

(52) U.S. Cl.
   CPC .................................... *G06F 3/0647* (2013.01)

(58) Field of Classification Search
   None
   See application file for complete search history.

(56) References Cited

U.S. PATENT DOCUMENTS

| | | | |
|---|---|---|---|
| 2004/0133610 A1* | 7/2004 | Flam et al. | 707/200 |
| 2007/0100897 A1* | 5/2007 | Kelly et al. | 707/200 |
| 2009/0248597 A1* | 10/2009 | Fickie et al. | 706/13 |
| 2010/0292976 A1* | 11/2010 | Newcombe et al. | 703/13 |
| 2011/0106501 A1* | 5/2011 | Christian et al. | 703/1 |

OTHER PUBLICATIONS

Chernicoff, David. "Predictive Modeling: If the Prognose tools really work the will become datacenter essentials". Posted Jun. 29, 2011.*
Miller, Rich. "Romonet: Using Blueprints to Predict Performance". Posted Jun. 29, 2011.*
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Charles Rones
*Assistant Examiner* — Hewy Li
(74) *Attorney, Agent, or Firm* — Ryan, Mason & Lewis, LLP

(57) ABSTRACT

Techniques for improved snapshot data management for modeling and migration planning associated with data storage systems and datacenters. For example, a method comprises the following steps. A plurality of types of representation of states of a system are generated, data from the system is imported to a first type of representation, and a second type of representation is updated, via the first type of representation, with the imported data, wherein modeling is capable of being performed in the second type of representation, and not capable of being performed in the first type of representation.

20 Claims, 8 Drawing Sheets

US 9,195,400 B1

SNAPSHOT DATA MANAGEMENT FOR MODELING AND MIGRATION PLANNING OF DATA STORAGE SYSTEMS

FIELD

The field relates generally to data storage systems, and more particularly to techniques for modeling and migration planning for data storage systems.

BACKGROUND

As is known, a "snapshot" is a representation of a state of a system at a particular point in time. The use of snapshots in storage modeling and migration planning operations facilitates the planning of a data storage system as the system goes through different states during a set of configuration changes. It is to be understood that a data storage system may be part of a datacenter. Snapshots allow an administrator of the datacenter to update the configuration of the data storage system at multiple points in time. The ability to simulate a change to a representation of the datacenter (or data storage center) is referred to as "modeling," while actually implementing a change to the datacenter is referred to as "migration." For example, an administrator can model what a datacenter would look like given a proposed change to certain resources of a data storage system, while the actual implementation of the resource change would be considered a migration.

Thus, a snapshot can be an actual copy of the state of the data storage system or a representation of the simulated capabilities of the data storage system. In the former case, actual data of the data storage system is copied into the snapshot while, in the latter case, actual data of the system is not copied into the snapshot. However, it is known that different database schemas exist for snapshot data associated with the actual system (i.e., the former case above where data is referred to as "imported data") and for snapshot data associated with simulated capabilities of the system (i.e., the latter case above where data is referred to as "modeled data"). It is difficult to combine imported data and modeled data due to the disparate schemas. Thus, with existing approaches, if an administrator wants to generate some type of new migration planning functionality, new data objects have to be added to both schemas. Furthermore, additional overhead is incurred every time imported data and modeled data in snapshots is used, as such data has to be retrieved from two different schemas.

Accordingly, a need exists for improved snapshot data management for modeling and migration planning associated with data storage systems and datacenters.

SUMMARY

Embodiments of the invention provide techniques for improved snapshot data management for modeling and migration planning associated with data storage systems and datacenters.

For example, in one embodiment, a method comprises the following steps. A plurality of types of representation of states of a system are generated, data from the system is imported to a first type of representation, and a second type of representation is updated, via the first type of representation, with the imported data, wherein modeling is capable of being performed in the second type of representation, and not capable of being performed in the first type of representation. According to an embodiment, the system is a data storage system.

In another embodiment, a computer program product is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, the embodiments of the present invention are more scalable and reduce duplication of code as compared with prior approaches. Reports, scripting and GUI panels can be used as is for imported data, modeled data and combinations of imported and modeled data. Embodiments of the present invention facilitate the merging of data from different sources or times as configuration changes are not stored in separate schemas. In other words, the embodiments of the present invention standardize the approach of processing the imported and modeled data. Logging which tracks the changes can be standardized and can be applied every time new configuration changes are configured in a snapshot, thereby reducing the design cost when adding new functionality.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1:
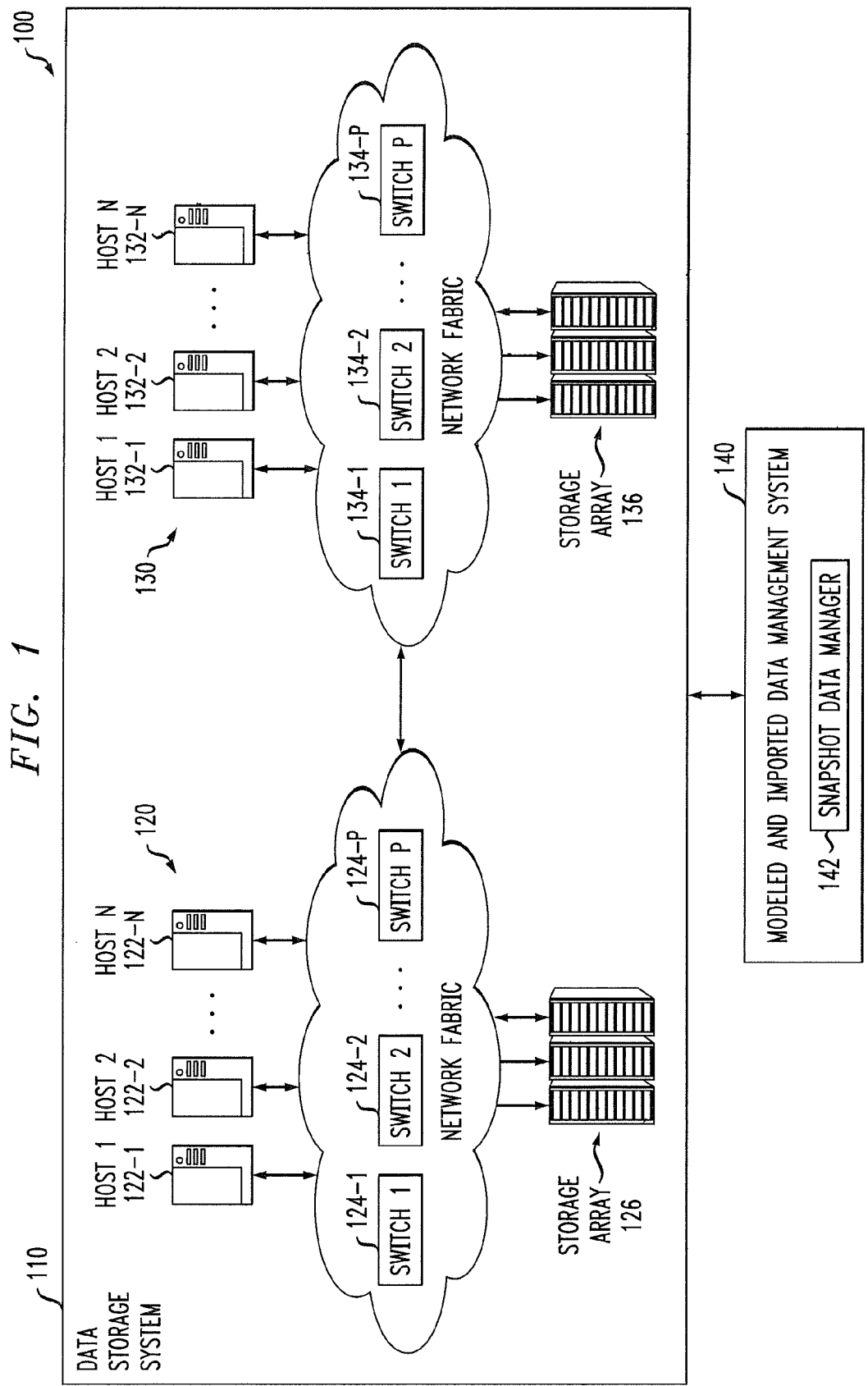
FIG. 1 shows a data storage environment with a modeled and imported data management system according to an embodiment of the invention.

FIG. 1 shows a data storage environment with storage array replication according to an embodiment of the invention. As shown in data storage environment 100 in FIG. 1, a data storage system 110 includes a first data storage subsystem 120 and a second data storage subsystem 130. The first data storage subsystem 120, as shown, includes a plurality of host computing devices 122-1, 122-2, . . . , 122-N, a plurality of switches 124-1, 124-2, . . . , 124-P implemented as part of a network fabric (e.g., Fibre Channel fabric), and at least one storage array 126. Similarly, the second data storage subsystem 130, as shown, includes a plurality of host computing devices 132-1, 132-2, . . . , 132-N, a plurality of switches 134-1, 134-2, . . . , 134-P implemented as part of a network fabric (again, e.g., Fibre Channel fabric), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (LUNs). Thus, each subsystem can have both logical execution components and physical execution components. Also, it is to be understood that each storage array may have one or more physical storage devices associated therewith.

Also shown in system environment 100 is a modeled and imported data management system 140. The management system 140 is a computer-based tool used by administrators of the data storage system 110 to plan and automate the acquisition, distribution and migration of imported and modeled data within the data storage system. Thus, assume that imported and modeled data has to be acquired, distributed, and/or migrated from storage array 126 in subsystem 120 to storage array 136 in subsystem 130, or vice versa. Also, imported and modeled data may need to be acquired, distributed and/or migrated from one storage array to another storage array within the same subsystem. Reasons for the data acquisition, distribution and/or migration are application-dependent, but could be driven by data and resource management decisions made by the infrastructure provider.

The management system 140 includes a snapshot data manager 142, which controls, by using snapshots and event windows (as described further below), the acquisition, distribution and/or migration of imported and modeled data in the data storage system 110.

In accordance with embodiments of the present invention, a snapshot refers to a point in time representation of a data storage system, and may include a set of planned configuration changes. Snapshots can contain a complete copy of the information in connection with the environment or just sufficient information to represent the environment at different points in time. As used herein, a "current snapshot" refers to a present state of the data storage system. In accordance with embodiments of the present invention, information is updated in a current snapshot by importing/re-importing data and/or assets. Data collected from a storage environment is imported into the current snapshot using a data source, e.g., SYMAPI. In accordance with embodiments of the present invention, modeling is not performed in this snapshot. As used herein, a "planned snapshot" refers to a migration state snapshot that stores a configuration(s) that is required for completing migration, e.g., masking/mapping. In accordance with embodiments of the present invention, no data is imported directly into this snapshot, and modeling can be performed in this snapshot. As used herein, a "planned after snapshot" refers to a production state snapshot that facilitates configuration changes that are required after a migration to get the storage environment to its desired end state. In accordance with embodiments of the present invention, no data is imported directly into this snapshot, and modeling can be performed in this snapshot. It is to be understood that the embodiments of the present invention are not necessarily limited to storage snapshots, and may generally apply to other configurations or representations used when modeling systems at different points in time.

Figure 2:
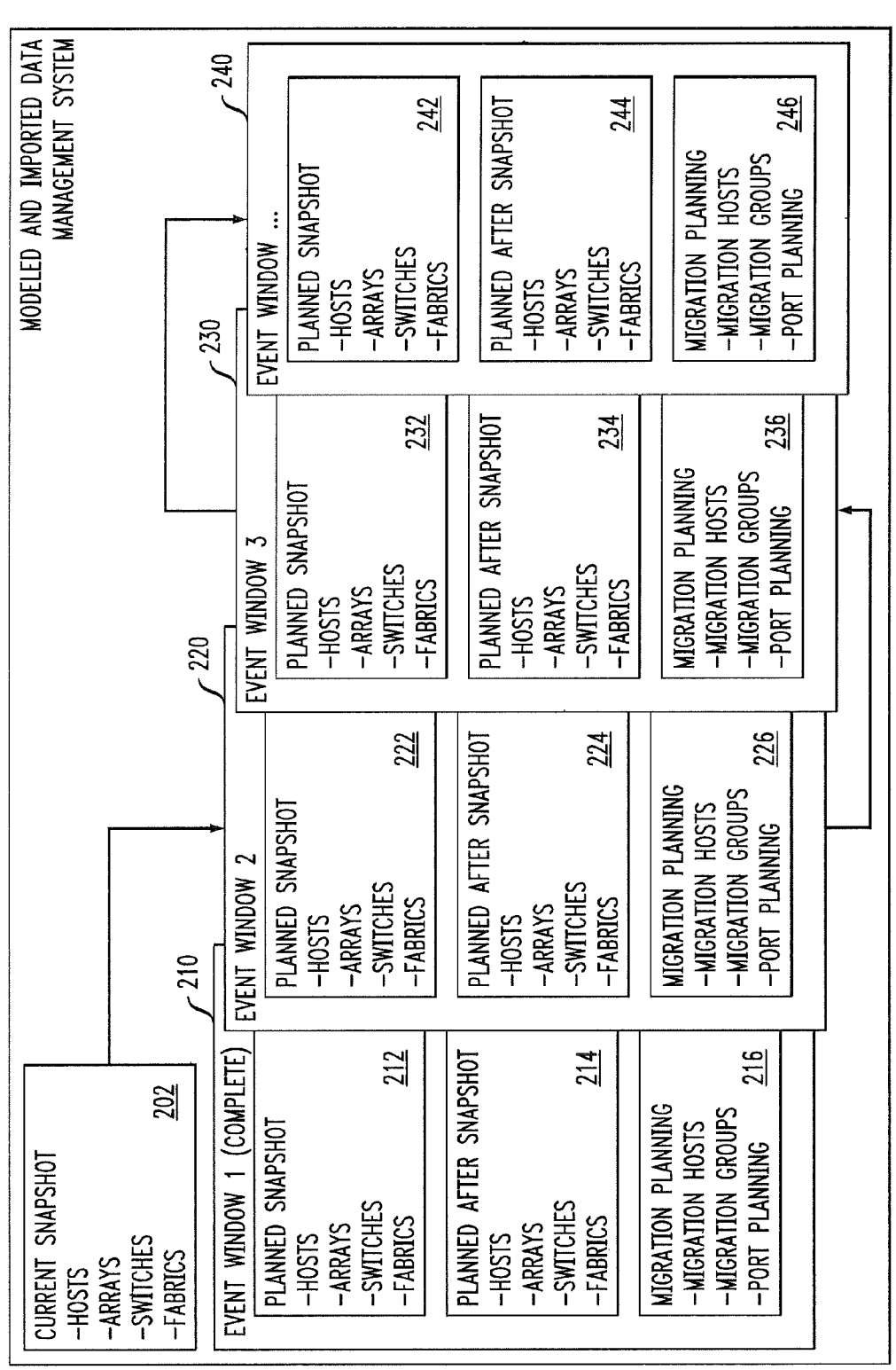
FIG. 2 shows a modeled and imported data management system according to an embodiment of the invention.

FIG. 2 shows a modeled and imported data management system 200 according to an embodiment of the invention. The system 200 includes a current snapshot 202 and a plurality of event windows 210, 220, 230 and 240. It is to be understood that the number of event windows is for purposes of illustration, and that there may be more or fewer event windows. As can be seen, each event window includes a planned snapshot 212, 222, 232, 242 and a planned after snapshot 214, 224, 234, 244. The snapshots 202, 212-242 and 214-244 include, for example, host, array, switch and fabric information. In accordance with an embodiment of the present invention, an event window at least groups a planned snapshot (migration state snapshot) and a planned after snapshot (production state snapshot) together. The event window represents a defined set of configuration changes to the storage environment (e.g., if a migration occurs on a particular weekend, the event window represents that weekend). As seen in FIG. 2, the event windows 210, 220, 230, 240 further include migration planning data 216, 226, 236 and 246, including, for example, migration hosts, groups and port planning.

Referring to FIG. 2, event window 1 210 represents a closed/complete event window, i.e., a window that is not being changed. The remaining windows 220, 230 and 240 are pending, i.e., still subject to modification. As can be seen in FIG. 2, the current snapshot 202 is the initial snapshot for the first pending event window (in this case, event window 2 220). If, for example, event windows 1 and 2 210, 220 were closed, the current snapshot would be the initial snapshot for event window 3 230. This continues until all event windows are closed. According to an embodiment, when the last event window is closed, the current snapshot may be imported into the event windows, but none of the event windows will be updated as a result of the importation.

As illustrated by the arrows, the initial snapshot for event window 3 230 comes from event window 2 220 and the initial snapshot for event window 4 240 comes from event window 3 230. For example, according to an embodiment of the present invention, the planned after snapshot 224 is the initial snapshot for event window 230 and the planned after snapshot 234 is the initial snapshot for event window 240.

In accordance with embodiments of the present invention, due to the connection between windows, a user can plan multiple event windows at the same time. For example, according to an embodiment of the present invention, modeling that is completed in one event window (e.g., event window 2 220) will also be visible in subsequent event windows (e.g., event windows 230, 240). For example, a masking setup in the planned after (production state) snapshot of one event window (e.g., window 220) will be visible in the planned snapshot of the subsequent event window(s) (e.g., windows 230, 240). This effect on multiple event windows is achieved by recording modeling changes made for a snapshot in a differential format and applying them to the environment presented by the previous snapshot.

Figure 3:
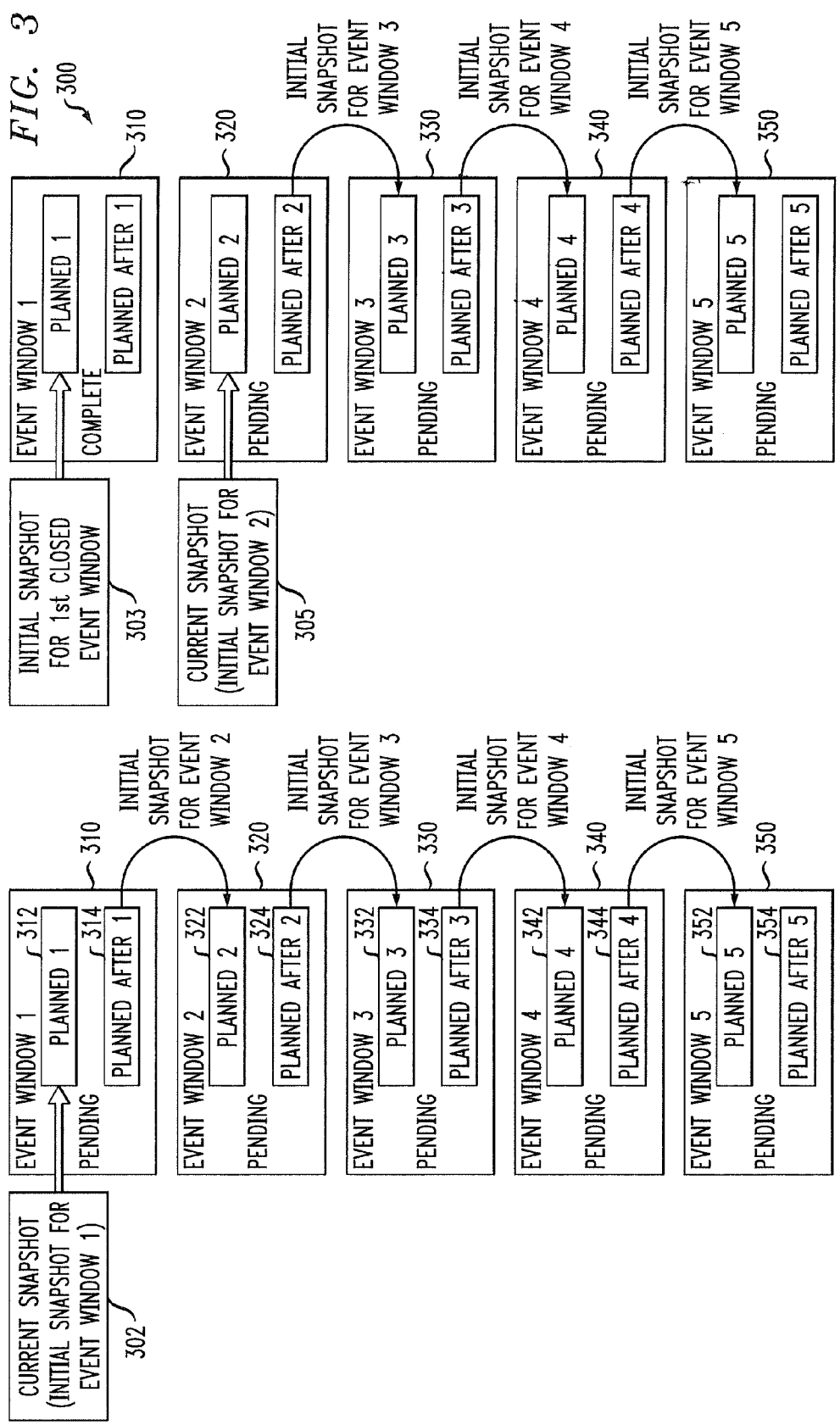
FIG. 3 shows a first snapshot methodology associated with the modeled and imported data management system of FIG. 2.

FIG. 3 shows a first snapshot methodology 300 associated with the modeled and imported data management system of FIG. 2. As can be seen, in the first column all of the event windows 310, 320, 330, 340 and 350 are pending, the current snapshot 302 is the initial snapshot for event window 310 and the initial snapshot for the subsequent event windows 320, 330, 340 and 350 are the planned after snapshots 314, 324, 334 and 344 of the preceding event windows 310, 320, 330 and 340. In the second column, the first event window 310 is closed/complete, and the remaining event windows 320, 330, 340 and 350 are pending. In accordance with an embodiment of the present invention, the initial snapshot 303 for the event window 310 in column 2 is a copy of the current snapshot, for example at the time of or prior to the event window being closed, which is renamed as the initial snapshot 303 of the first closed event window. In other words, a difference between snapshots 303 and 305 is that no updates have been made to snapshot 303 after event window 310 was closed. As event window 310 is closed, it is not updated with any new imported data; snapshot 303 and window 310 are not updated once window 310 is closed/complete. Any new imports update snapshot 305.

According to an embodiment, if there is a window preceding a closed event window, the initial snapshot of the closed event window is the planned after snapshot of the previous event window. As can be seen from FIG. 3, the initial snapshot of the first pending event window 320 in the second column is the current snapshot 305 at that time, and the initial snapshot for the subsequent event windows 330, 340 and 350 are the planned after snapshots 324, 334 and 344 of the preceding event windows 320, 330 and 340.

Figure 4:
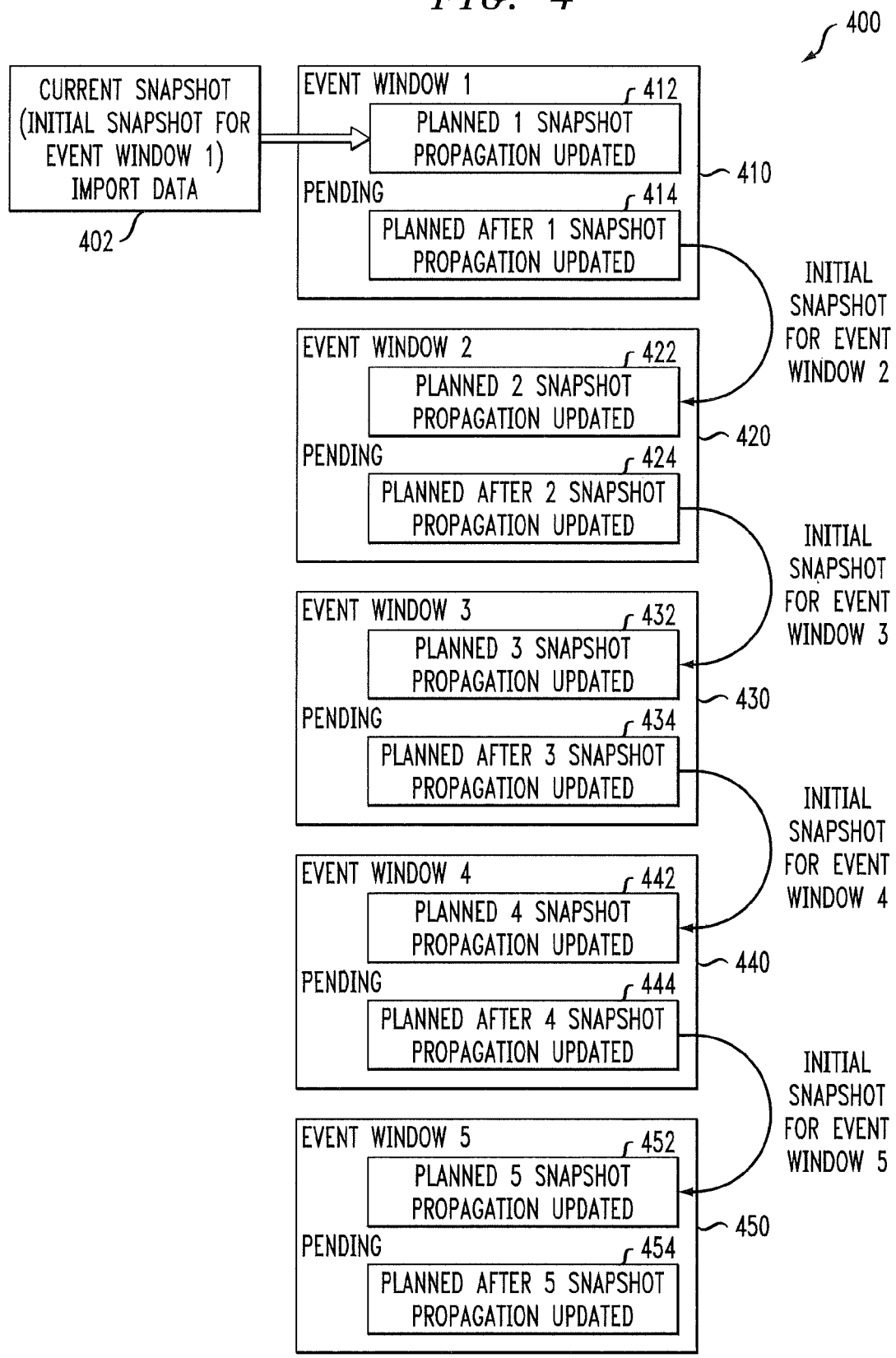
FIG. 4 shows a second snapshot methodology associated with the modeled and imported data management system of FIG. 2.
Figure 4:
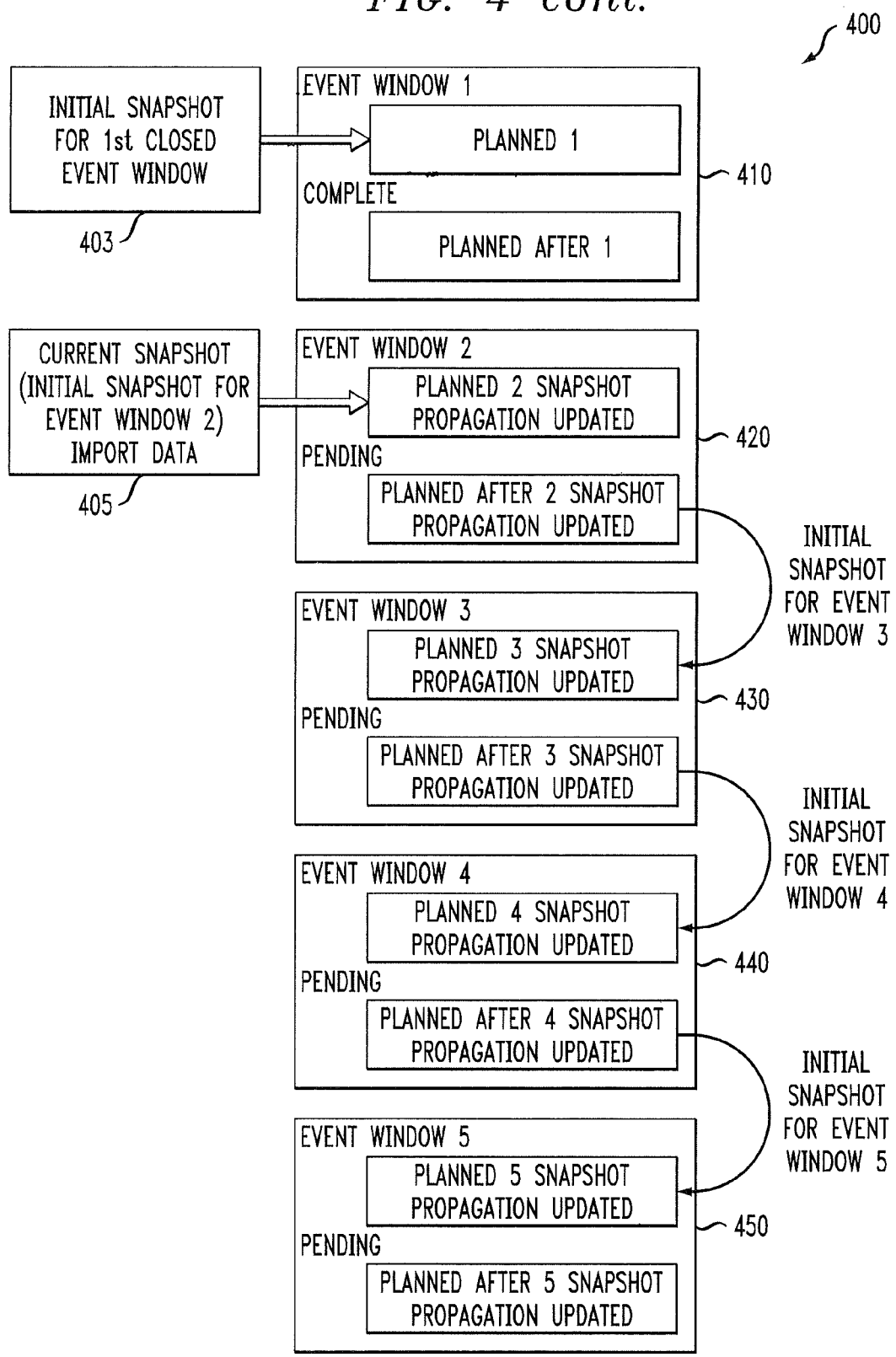

FIG. 4 shows a second snapshot methodology 400 associated with the modeled and imported data management system of FIG. 2. FIG. 4 illustrates a scenario where data from the data storage system 110 is imported into the current snapshot 402. In accordance with embodiments of the present invention, a current snapshot is the only type of snapshot into which data is imported. New imports will only be imported into a current snapshot, and the imported data will overwrite existing data in the current snapshot. For example, if a user re-imports a Symmetrix array which already exists in the current snapshot, the array in the current snapshot is overwritten. Various techniques may be used for importing data into a current snapshot, including, but not limited to storage array network (SAN) summary, network shared disk (NSD) S, CLARIION, host comma separated value (CSV), HITACHI data systems (HDS), etc.

As can be seen in FIG. 4, in accordance with an embodiment, when data is imported into the current snapshot, all snapshots that are in pending event windows are updated with the changes that have been made to the current snapshot. FIG. 4 provides an example of how the updates are propagated. For example, in the first column, following similar methods to those described in connection with FIG. 3, the data imported into the current snapshot 402 is applied to the planned snapshot 412 and planned after snapshot 414, and from planned after snapshot 414 to planned snapshot 422 as the initial snapshot for event window 420, and so on through each of the pending windows 410, 420, 430, 440 and 450 until the updating is completed.

In the second column, following similar methods to those described in connection with FIG. 3, the first event window 410 is closed/complete, and the remaining event windows 420, 430, 440 and 450 are pending. In accordance with an embodiment of the present invention, the initial snapshot 403 for the event window 410 in column 2 is a copy of the current snapshot at the time of or prior to the event window being closed. The initial snapshot of the first pending event window 420 in the second column is the current snapshot 405 which includes the imported data from the data storage system 110. Therefore, the data imported into the current snapshot 405 is applied to the planned snapshot 422 and planned after snapshot 424, and from planned after snapshot 424 to planned snapshot 432 as the initial snapshot for event window 430, and so on through each of the pending windows 420, 430, 440 and 450 is completed.

As a result, the imported data is directly imported into only the current snapshots, and not into the planned or planned after snapshots, only reaching the planned and planned after snapshots through the propagation techniques described herein.

Figure 5:
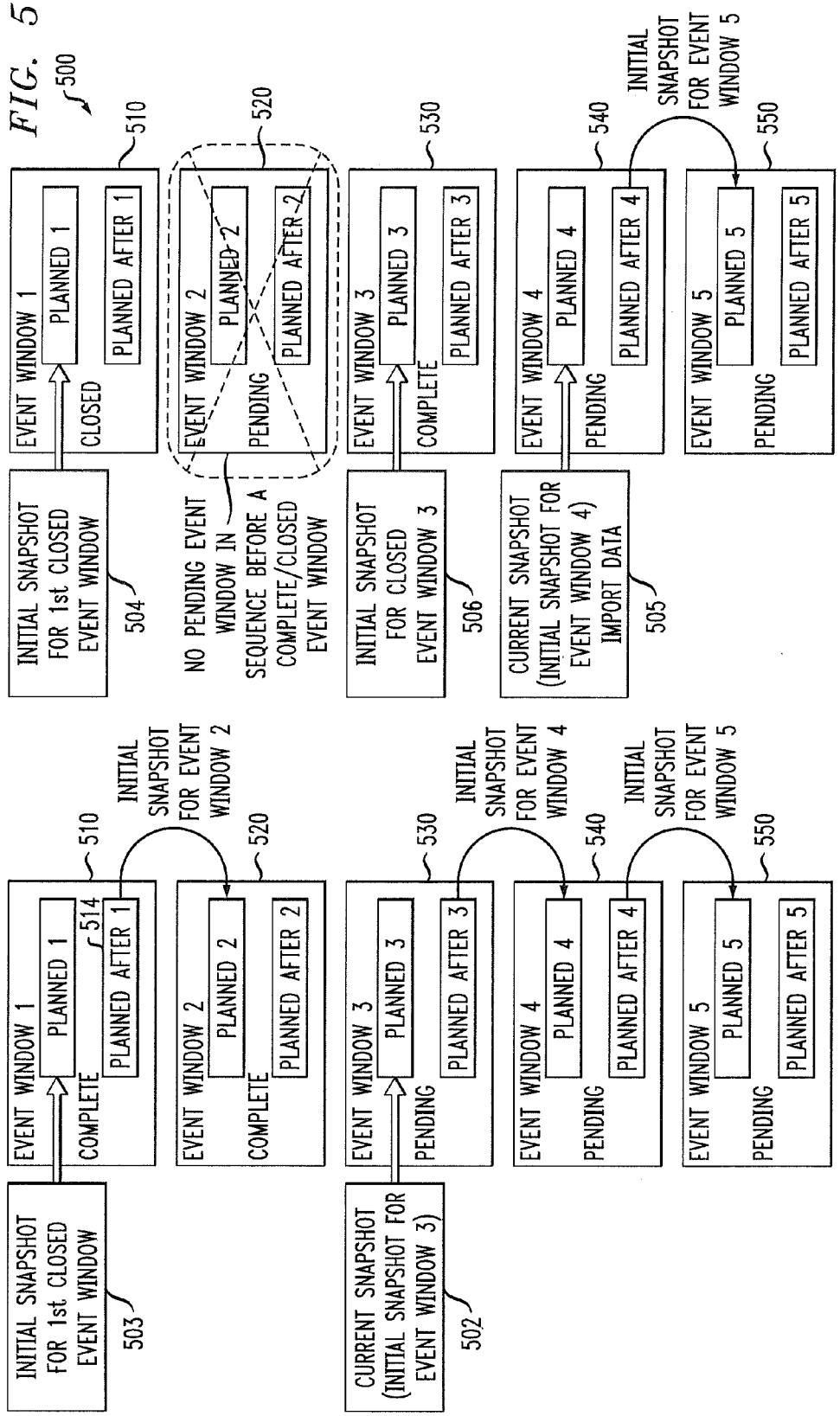
FIG. 5 shows a third snapshot methodology associated with the modeled and imported data management system of FIG. 2.

FIG. 5 shows a third snapshot methodology 500 associated with modeled and imported data management system of FIG. 2. FIG. 5 illustrates that a pending event window cannot precede a closed event window in accordance with an embodiment of the present invention. In the second column of FIG. 5, if a user wishes to close/complete event window 3 530, then event window 2 520 must be closed before closing/completing event window 3 530.

FIG. 5 also illustrates that the current snapshot 502 in the first column and the current snapshot 505 in the second column gets applied as the initial snapshot for the first pending event window; in this case window 530 in the first column, and window 540 in the second column. Further, the initial snapshots 503 and 504 for the first event windows 510 in the first and second columns are similar to the initial snapshot 303 in FIG. 3, i.e., a copy of the current snapshot, for example at the time of or prior to the event window 510 being closed. FIG. 5 also illustrates that the initial snapshot for closed window 520 in the first column is the planned after snapshot 514 from closed window 510.

With the understanding that the second column in FIG. 5 represents an invalid configuration for purposes of explanation, initial snapshot 506 for event window 530 could be the planned after snapshot of window 520 if window 520 was closed in a valid configuration. According to an embodiment, assuming a valid configuration, the initial snapshot 506 could also be the planned after snapshot of window 510.

Figure 6:
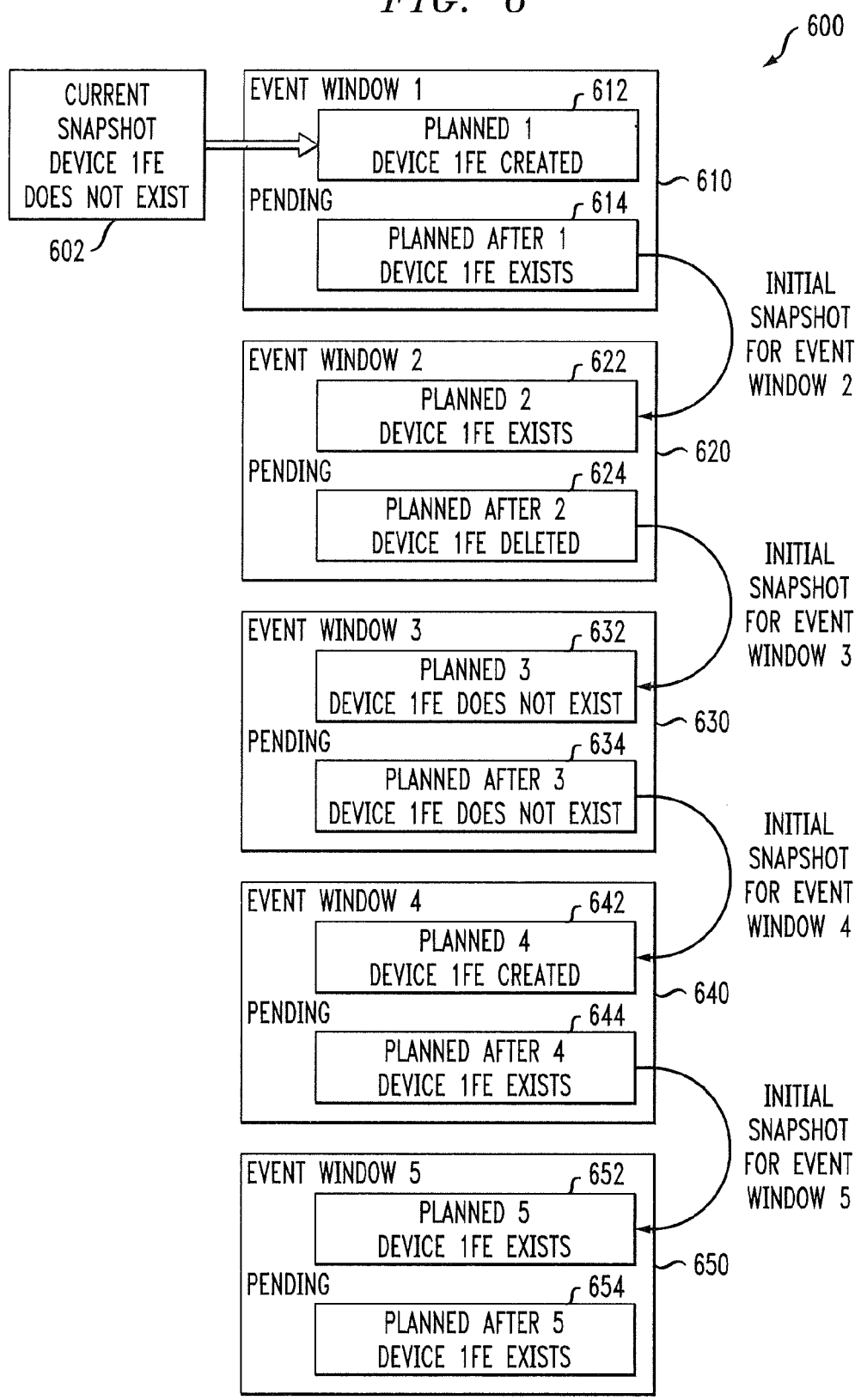
FIG. 6 shows a fourth snapshot methodology associated with the modeled and imported data management system of FIG. 2.

FIG. 6 shows a fourth snapshot methodology 600 associated with the modeled and imported data management system of FIG. 2. FIG. 6 depicts a scenario where a new device is contemplated for addition to an array. The methodology as set forth in FIG. 6 allows a user to plan new devices prior to having physical access to the array, model the devices and use them as if they actually existed. As per FIG. 6, the device 1FE is created in the planned snapshot 612 of the first event window 610. The device 1FE is not visible in the current snapshot 602, but is visible in the planned snapshot 612 (migration state) and planned after snapshot 614 (production state) of the event window 510.

In subsequent windows, the device can be continued or deleted. For example, based on the initial snapshot being the planned after snapshot 614 for window 620, the device 1FE exists in planned snapshot 622. However, the device can be deleted in planned after snapshot 624, so that it is not present in planned snapshot 632 or planned after snapshot 634 of window 630. However, the device can be created in planned snapshot 642 of window 640 and, thereby, appear in subsequent snapshots 644, 652 and 654 of windows 640 and 650.

Figure 7:
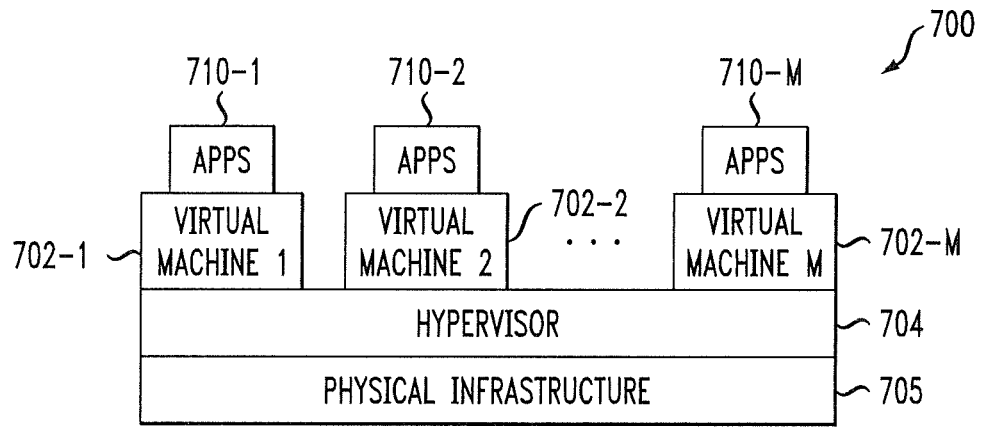
FIGS. 7 and 8 show examples of processing platforms that may be utilized to implement at least a portion of the systems of FIGS. 1 and 2.

As shown in FIG. 7, the cloud infrastructure 700 comprises virtual machines (VMs) 702-1, 702-2, . . . 702-M implemented using a hypervisor 704. The hypervisor 704, as mentioned above, is an example of what is more generally referred to herein as "virtualization infrastructure." The hypervisor 704 runs on physical infrastructure 705 (e.g., such as may include CPUs and/or storage devices). The cloud infrastructure 700 further comprises sets of applications 710-1, 710-2, . . . 710-M running on respective ones of the virtual machines 702-1, 702-2, . . . 702-M (utilizing associated logical units (LUNs)) under the control of the hypervisor 704.

Although only a single hypervisor 704 is shown in the example of FIG. 7, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 704 which, as shown in FIG. 7, is directly inserted on top of the computer hardware in order to allocate hardware resources of the physical computer (physical infrastructure 705) dynamically and transparently. The hypervisor 704 affords the ability for multiple operating systems to run concurrently on a single physical computer and share hardware resources with each other. The hypervisor 704 thus also manages disk I/O scheduling associated with the workloads performed by each virtual machine.

An example of a commercially available hypervisor platform that may be used to implement portions of the cloud infrastructure 700 in one or more embodiments of the invention is the VMware® vSphere™ which may have an associated virtual infrastructure management system such as the VMware® vCenter™. The underlying physical infrastructure 705 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 700.

Figure 8:
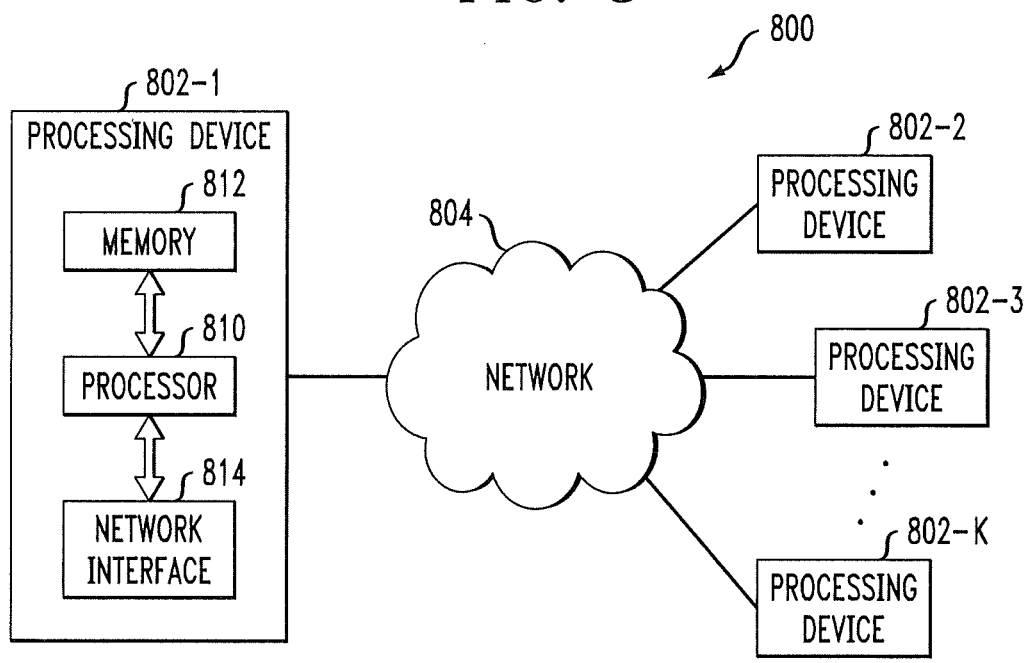

An example of a processing platform on which the cloud infrastructure 700 and/or the modeled and imported data management system 140 and snapshot data manager 142 of FIG. 1 may be implemented is processing platform 800 shown in FIG. 8. The processing platform 800 in this embodiment comprises at least a portion of the system 100 and includes a plurality of processing devices denoted 802-1, 802-2, 802-3, . . . 802-K, which communicate with one another over a network 804. One or more of the elements of system 100 may therefore each run on one or more computers or other processing platform elements, each of which may be viewed as an example of what is more generally referred to herein as a "processing device." As illustrated in FIG. 8, such a device generally comprises at least one processor 810 and an associated memory 812, and implements one or more functional modules for controlling certain features of system 100. Again, multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. The memory 812 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the processing device 802-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the processing device 802-1 is network interface circuitry 814, which is used to interface the server with the network 804 and other system components. Such circuitry may comprise conventional transceivers of a type well known in the art.

The other processing devices 802 of the processing platform 800 are assumed to be configured in a manner similar to that shown for processing device 702-1 in the figure.

The processing platform 800 shown in FIG. 8 may comprise additional known components such as batch processing systems, parallel processing systems, physical machines, virtual machines, virtual switches, storage volumes, logical units, etc. Again, the particular processing platform shown in FIG. 8 is presented by way of example only, and system 100 of FIG. 1 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, the embodiments of the present invention are more scalable and reduce duplication of code as compared with prior approaches. Reports, scripting and GUI panels can be used as is for imported data, modeled data and combinations of imported and modeled data. Embodiments of the present invention facilitate the merging of data from different sources or times as configuration changes are not stored in separate schemas. In other words, the embodiments of the present invention standardize the approach of processing the imported and modeled data. Logging which tracks the changes can be standardized and can be applied every time new configuration changes are configured in a snapshot, thereby reducing the design cost when adding new functionality.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
generating a plurality of types of representation of states of a data storage system;
importing data from the data storage system to a first type of representation, wherein the first type of representation comprises a current snapshot representing a current state of the data storage system;
updating, via the first type of representation, a second type of representation with the imported data, wherein:
modeling is capable of being performed in the second type of representation, and not capable of being performed in the first type of representation; and
the second type of representation comprises a planned snapshot representing a migration state of the data storage system; and
generating a series of event windows representing respective time periods of a migration, wherein the event windows each comprise a planned snapshot, and at least one configuration change to one or more resources of the data storage system; and
wherein the generating, importing and updating steps are executed via at least one processor coupled to a memory.

2. The method of claim 1, wherein the event windows further comprise:
a third type of representation capable of being updated with the imported data from the current snapshot, wherein modeling is capable of being performed in the third type of representation.

3. The method of claim 2, wherein the third type of representation comprises a planned after snapshot representing a production state of the data storage system.

4. The method of claim 2, further comprising designating the current snapshot as an initial snapshot of a first pending event window of the series of event windows.

5. The method of claim 3, wherein:
a previous event window of the series of event windows comprises a planned snapshot and a planned after snapshot;
a next event window of the series of event windows comprises a second planned snapshot and a second planned after snapshot; and
an initial snapshot of the next event window is the planned after snapshot from the previous event window.

6. The method of claim 5, further comprising designating the current snapshot as the initial snapshot of the next event window if the previous event window is closed and the next event window is pending.

7. The method of claim 2, further comprising:
creating a device in a planned snapshot of an event window; and
updating the third type of representation with the device, wherein the device is not present in the current snapshot.

8. The method of claim 7, wherein:
the event window is a previous event window of the series of event windows;
the third type of representation comprises a planned after snapshot representing a production state of the data storage system;
a next event window of the series of event windows comprises a second planned snapshot and a second planned after snapshot; and
the device is present in the second planned snapshot and the second planned after snapshot.

9. The method of claim 8, further comprising deleting the device from the second planned after snapshot.

10. A computer program product comprising a processor-readable storage medium having encoded therein executable code of one or more software programs, wherein the one or more software programs when executed by the processor device implement a method comprising:
generating a plurality of types of representation of states of a data storage system;
importing data from the data storage system to a first type of representation, wherein the first type of representation comprises a current snapshot representing a current state of the data storage system;
updating, via the first type of representation, a second type of representation with the imported data, wherein:
modeling is capable of being performed in the second type of representation, and not capable of being performed in the first type of representation; and
the second type of representation comprises a planned snapshot representing a migration state of the data storage system; and
generating a series of event windows representing respective time periods of a migration, wherein the event windows each comprise a planned snapshot, and at least one configuration change to one or more resources of the data storage system.

11. An apparatus comprising:
a memory; and
a processor operatively coupled to the memory and configured to:
generate a plurality of types of representation of states of a data storage system;
import data from the system to a first type of representation, wherein the first type of representation comprises a current snapshot representing a current state of the data storage system;
update, via the first type of representation, a second type of representation with the imported data, wherein:
modeling is capable of being performed in the second type of representation, and not capable of being performed in the first type of representation; and
the second type of representation comprises a planned snapshot representing a migration state of the data storage system; and
generate a series of event windows representing respective time periods of a migration, wherein the event windows each comprise a planned snapshot, and at least one configuration change to one or more resources of the data storage system.

12. The apparatus of claim 11, wherein the event windows further comprise:

a third type of representation capable of being updated with the imported data from the current snapshot, wherein modeling is capable of being performed in the third type of representation.

13. The apparatus of claim 12, wherein the third type of representation comprises a planned after snapshot representing a production state of the data storage system.

14. The apparatus of claim 12, wherein the processor is further operative to designate the current snapshot as an initial snapshot of a first pending event window of the series of event windows.

15. The apparatus of claim 13, wherein:
a previous event window of the series of event windows comprises a planned snapshot and a planned after snapshot;
a next event window of the plurality of event windows comprises a second planned snapshot and a second planned after snapshot; and
an initial snapshot of the next event window is the planned after snapshot from the previous event window.

16. The apparatus of claim 15, wherein the processor is further operative to designate the current snapshot as the initial snapshot of the next event window if the previous event window is closed and the next event window is pending.

17. The apparatus of claim 12, wherein the processor is further operative to:
create a device in a planned snapshot of an event window; and
update the third type of representation with the device, wherein the device is not present in the current snapshot.

18. The apparatus of claim 17, wherein:
the event window is a previous event window of the series of event windows;
the third type of representation comprises a planned after snapshot representing a production state of the data storage system;
a next event window of the series of event windows comprises a second planned snapshot and a second planned after snapshot; and
the device is present in the second planned snapshot and the second planned after snapshot.

19. The method of claim 1, wherein the at least one configuration change originates in a first event window of the series of event windows, and is visible in subsequent event windows of the series of event windows.

20. The apparatus of claim 11, wherein the at least one configuration change originates in a first event window of the series of event windows, and is visible in subsequent event windows of the series of event windows.

* * * * *